United States Patent
Bhatia et al.

(10) Patent No.: US 8,588,750 B2
(45) Date of Patent: Nov. 19, 2013

(54) METHOD AND APPARATUS FOR PROVIDING INTERACTIVE SERVICES TO USERS USING UNICAST AND BROADCAST WIRELESS NETWORKS

(75) Inventors: Randeep S. Bhatia, Somerset, NJ (US); Girija J. Narlikar, Basking Ridge, NJ (US); Sampath Rangarajan, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 608 days.

(21) Appl. No.: 11/694,977

(22) Filed: Mar. 31, 2007

(65) Prior Publication Data
US 2008/0242273 A1   Oct. 2, 2008

(51) Int. Cl.
*H04M 3/42* (2006.01)

(52) U.S. Cl.
USPC ........... 455/414.1; 455/414.2; 455/414.3; 455/414.4; 455/456.1; 455/456.6; 709/247; 370/352

(58) Field of Classification Search
USPC ............ 455/414.1; 709/247, 203; 370/352, 370/395.4, 328, 329
See application file for complete search history.

(56) References Cited

U.S. PATENT DOCUMENTS

| | | |
|---|---|---|
| 7,171,473 B1 | 1/2007 | Eftis et al. |
| 2002/0199209 A1* | 12/2002 | Shiga .............. 725/136 |
| 2003/0012180 A1* | 1/2003 | Donahue et al. .......... 370/352 |
| 2003/0061160 A1 | 3/2003 | Asahina |
| 2003/0093476 A1 | 5/2003 | Syed |
| 2003/0095540 A1 | 5/2003 | Mulligan et al. |
| 2003/0169704 A1 | 9/2003 | Okanoue |
| 2004/0031058 A1* | 2/2004 | Reisman .............. 725/112 |
| 2004/0253996 A1 | 12/2004 | Chen et al. |
| 2004/0260839 A1* | 12/2004 | Onoda et al. ............ 709/247 |
| 2005/0009547 A1 | 1/2005 | Harris et al. |

(Continued)

FOREIGN PATENT DOCUMENTS

| | | |
|---|---|---|
| CN | 1542667 A | 11/2004 |
| EP | 0 716 552 B1 | 6/1996 |

(Continued)

OTHER PUBLICATIONS

PCT Search Report and Written Opinion corresponding PCT/US2008/003272, dated Mar. 13, 2008, Lucent Technologies Inc., Applicant.

(Continued)

*Primary Examiner* — Kamran Afshar
*Assistant Examiner* — Shahriar Behnamian
(74) *Attorney, Agent, or Firm* — Wall & Tong, LLP (57) ABSTRACT

The invention includes a method and apparatus for providing interactive services using unicast wireless networks and broadcast wireless networks. A method includes receiving content interaction information indicative of interactions by a user with content presented at a wireless user terminal, obtaining at least one service parameter, and providing a service using the content interaction information and the at least one service parameter, wherein the service is provided using one of the unicast wireless network or the broadcast wireless network. The content for which content interaction information is received is provided to the wireless user terminal using a broadcast wireless network and the content interaction information is received over a unicast wireless network. The service that is provided may include providing modified content over the broadcast wireless network, providing personalized content over the unicast wireless network, operating a proxy for a network-based service, and the like.

22 Claims, 4 Drawing Sheets

(56) References Cited

U.S. PATENT DOCUMENTS

| | | | |
|---|---|---|---|
| 2005/0027742 A1 | 2/2005 | Eichstaedt et al. | |
| 2005/0198354 A1 | 9/2005 | Holloway, Jr. | |
| 2006/0019679 A1 | 1/2006 | Rappaport | |
| 2006/0046699 A1 | 3/2006 | Guyot et al. | |
| 2006/0126556 A1* | 6/2006 | Jiang et al. | 370/328 |
| 2006/0135143 A1 | 6/2006 | Suematsu | |
| 2006/0171523 A1 | 8/2006 | Greenwell | |
| 2006/0229065 A1 | 10/2006 | Lazaridis et al. | |
| 2007/0032225 A1 | 2/2007 | Konicek et al. | |
| 2007/0153820 A1* | 7/2007 | Gould | 370/432 |
| 2007/0168523 A1 | 7/2007 | Jiang et al. | |
| 2007/0239884 A1 | 10/2007 | Karmakar et al. | |
| 2007/0260744 A1 | 11/2007 | Shenfield | |
| 2007/0286121 A1* | 12/2007 | Kolakowski et al. | 370/329 |
| 2007/0287475 A1 | 12/2007 | Jeong et al. | |
| 2008/0025307 A1 | 1/2008 | Preiss et al. | |
| 2008/0101317 A1* | 5/2008 | Bouazizi | 370/342 |
| 2009/0298496 A1 | 12/2009 | Pettersson et al. | |

FOREIGN PATENT DOCUMENTS

| | | |
|---|---|---|
| EP | 1 853 045 A | 11/2007 |
| FR | 2 884 379 A | 10/2006 |
| JP | 2002-541750 | 10/2000 |
| JP | 2002084522 | 3/2002 |
| WO | WO 02/054174 A | 7/2002 |
| WO | WO 2004/008789 A | 1/2004 |

OTHER PUBLICATIONS

International Search Report and Written Opinion in PCT/US2008/003271, dated Aug. 14, 2008, 18 pages.

Huang, Y-W et al.: "A bandwidth-sensitive update scheduling method for Internet push" 19980526; 19980526-19980529, May 26, 1998, pp. 303-310, XP010284011, p. 303, paragraph 1 Introduction—p. 304, paragraph 1, Introduction.

Dec. 14, 2013 Notice of Reason for Refusal in JP 2010-502078, Alcatel-Lucent USA Inc., Applicant, 3 pages.

* cited by examiner

METHOD AND APPARATUS FOR PROVIDING INTERACTIVE SERVICES TO USERS USING UNICAST AND BROADCAST WIRELESS NETWORKS

FIELD OF THE INVENTION

The invention relates to the field of communication networks and, more specifically, to providing interactive services over wireless networks.

BACKGROUND OF THE INVENTION

Existing cellular networks support bidirectional unicast capabilities, while emerging cellular networks (e.g., Third Generation Partnership Project (3GPP) cellular networks), support coexistence of bidirectional unicast capabilities and broadcast capabilities. Disadvantageously, however, broadcast capabilities of such emerging networks are limited to non-personalized content and, further, the non-personalized content must be delivered to user terminals according to a fixed schedule.

SUMMARY OF THE INVENTION

Various deficiencies in the prior art are addressed through the invention of a method and apparatus for providing interactive services using unicast wireless networks and broadcast wireless networks. A method includes receiving content interaction information indicative of interactions by a user with content presented at a wireless user terminal, obtaining at least one service parameter, and providing a service using the content interaction information and the at least one service parameter, wherein the service is provided using one of the unicast wireless network or the broadcast wireless network. The content for which content interaction information is received is provided to the wireless user terminal using a broadcast wireless network and the content interaction information is received over a unicast wireless network. The service that is provided may include providing modified content over the broadcast wireless network, providing personalized content over the unicast wireless network, operating a proxy for a network-based service, and the like.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides extensible interactive services for wireless networks. At user terminals, users may interact with broadcast content provided to the user terminals over a broadcast wireless network. The content interactions at the user terminals are captured and provided to a management system over a unicast wireless network. The management system provides one or more services based on content interaction information received from one or more user terminals. The services that may be provided may include providing modified content over the broadcast wireless network, providing personalized content over the unicast wireless network, operating a proxy for a network-based service, and the like, as well as various combinations thereof.

Figure 1:
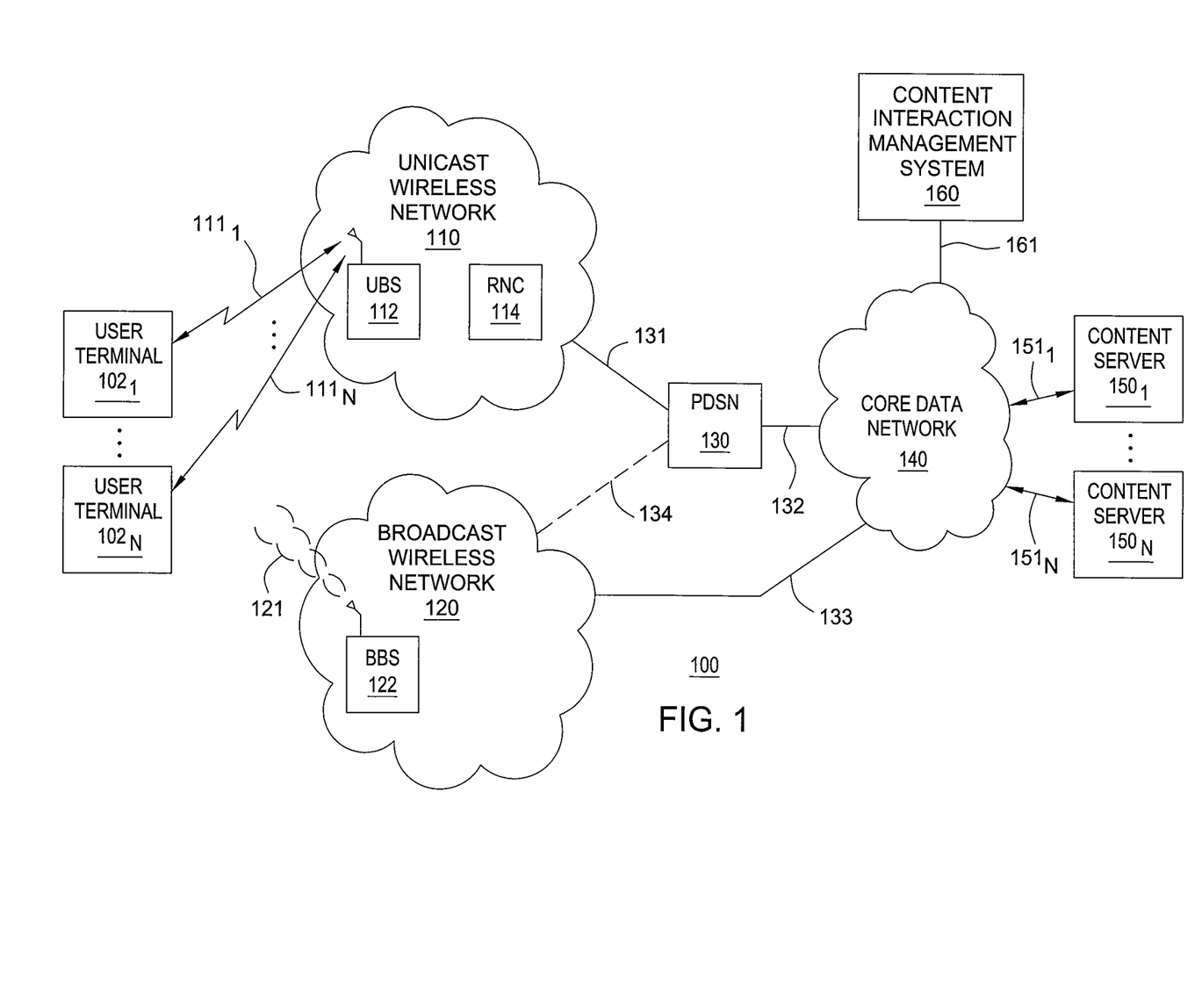
FIG. 1 depicts a high-level block diagram of a communication network.

FIG. 1 depicts a high-level block diagram of a communication network. Specifically, communication network 100 includes a plurality of user terminals (UTs) $102_1$-$102_N$ (collectively, UTs 102), a unicast wireless network (UWN) 110, a broadcast wireless network (BWN) 120, a packet data serving node (PDSN) 130, a core data network (CDN) 140, a plurality of content servers (CSs) $150_1$-$150_N$ (collectively, CSs 150), and a content interaction management system (CIMS) 160. As described herein, communication network 100 supports interactive services, providing services for UTs 102 in response to interaction by users of UTs 102 with content propagated from CSs 150 to UTs 102. The CIMS 160 manages content interactions services, as further described herein with respect to FIG. 1 and further depicted and described herein with respect to FIG. 2.

As depicted in FIG. 1, UTs 102 communicate with UWN 110 and BWN 120. The UTs $102_1$-$102_N$ receive communications from UWN 110 and transmit communications to UWN 110 using a respective bidirectional wireless links (BWLs) $111_1$-$111_N$ (collectively, BWLs 111). The UTs $102_1$-$102_N$ receive broadcast communications from BWN 120 using a unidirectional wireless link (UWL) 121. The UWL 121 is a broadcast link that is shared by UTs 102. The UTs 102 may tune to UWL 121 to receive content being broadcast. The UWL 121 may support multiple channels of broadcast content such that UTs 102 may tune to a channel on which particular content is being transmitted.

The UWN 110 communicates with PDSN 130 using a communication path (CP) 131. The PDSN 130 communicates with CDN 140 using a communication path (CP) 132. The BWN 120 communicates with CDN 140 using a communication path (CP) 133. In one embodiment, BWN 120 may communicate with PDSN 130 using a communication path (CP) 134. The PDSN 130 communicates with CDN 140 using a communication path (CP) 135. The CSs $150_1$-$150_N$ communicate with CDN 140 using respective communication paths (CPs) $151_1$-$151_N$ (collectively, CPs 151). The CIMS 160 communicates with CDN 140 using a communication path (CP) 161. In one embodiment, CIMS 160 optionally communicates directly with UWN 110 and/or BWN 120.

The CSs 150 provide content to UTs 102. In one embodiment, CSs 150 provide locally-stored content to UTs 102. In one embodiment, CSs 150 may provide remotely-available content (e.g., received from other content sources) to UTs 102. The CSs 150 provide broadcast content (also referred to herein as original broadcast content to denote content that has not been modified for a content interaction service) to UTs 102 over BWN 120. The CSs 150 provide unicast content (also referred to herein as original unicast content to denote content that has not been modified for a content interaction service) to UTs 102. The CSs 150 may also provide modified and/or additional broadcast content and/or personalized unicast content (i.e., content generated for a content interaction service) to UTs 102, depending on implementation.

The content (e.g., original broadcast content, additional and/or modified broadcast content, original unicast content, personalized unicast content, and the like) may include various types of content, such as text content, audio content, image content, video content, multimedia content, and the like, as well as various combinations thereof. For example, content provided by CSs 150 may include text-based content (e.g., news headlines, weather updates, stock quotes, and the like), audio content (e.g., audio clips, streaming audio such as radio stations, and the like), image content (e.g., still images, animated images, and the like) video content (e.g., video clips, streaming video, and the like), multimedia content (e.g., streaming television programming, on-demand television programming, and the like), software updates, and the like, as well as various combinations thereof.

In one embodiment, CSs 150 may provide content to UTs 102 directly using UWN 110 (for unicast content) or BWN 120 (for broadcast content). In one embodiment, CSs 150 may provide content to UTs 102 indirectly by providing content to CIMS 160 (which provides the content to UTs 102 using UWN 110 and BWN 120 and, optionally, using CDN 140, depending on the implementation). The CSs 150 may provide content to UTs 102 using various different content formats depending on factors such as the type of content being provided (e.g., audio vs. video, unicast vs. broadcast, and the like), the quality of content being provided, the quality-of-service with which the content is provided, the network implementation in which the content is provided (i.e., whether or not CIMS 160 operates as a proxy/cache for CSs 150), and like factors, as well as various combinations thereof.

The CDN 140 facilitates communications in support of the present invention (e.g., communication of original broadcast and unicast content from CSs 150 to UTs 102, communication of content interaction information from UTs 102 to CIMS 160, communication of modified and/or additional broadcast content, personalized unicast content, and the like, from CIMS 160 to UTs 102, and the like, as well as various combinations thereof). For example, CDN 140 may be any packet-based network, e.g., a public data network (e.g., the Internet), a private data network, and the like, as well as various combinations thereof. The PDSN 130 facilitates communications between wireless access networks and core data networks (illustratively, between UWN 110 and CDN 150 and between BWN 120 and CDN 150), operating as an access point between wireless access networks UWN 110 and BWN 120 and CDN 150).

The UWN 110 supports bidirectional unicast communications for UTs 102. The UWN 110 includes a unicast base station (UBS) 112 and a radio network controller (RNC) 114, among other components omitted for purposes of clarity. The UNW 110 supports downstream communication of content to UTs 102 using BWLs 111 (as forward wireless links), respectively. The content may include any content, including original unicast content, personalized unicast content provided as part of a content interaction service, and the like, as well as various combinations thereof. The UNW 110 supports upstream communication of content interaction information from UTs 102 using BWLs 111 (as reverse wireless links), respectively. For example, UWN 110 may be a CDMA2000-based EVDO wireless network.

The BWN 120 supports unidirectional broadcast communications for UTs 102. The BWN 120 includes a broadcast base station (BBS) 122, among other components omitted for purposes of clarity (e.g., controllers, servers, or like components which may control broadcasting of content from BWN 120). The BWN 120 supports broadcasting of content to UTs 102 using UWL 121, which may support one or more broadcast channels such that UTs 102 may tune to different broadcast channels to receive different content. Specifically, BWN supports broadcasting of content to UTs 102. As described herein, the content may include original broadcast content, modified and/or additional broadcast content provided as part of a content interaction service, and the like, as well as various combinations thereof. For example, BWN 110 may be MediaFLO broadcast wireless network.

The UTs 102 include terminals supporting wireless communications. The UTs 102 support bidirectional unicast communications via UWN 110, including transmitting and receiving information over UWN 110 using BWLs 111. The UTs 102 transmit content requests, content interaction information, and the like, using UWN 110. The UTs 102 receive unicast content, as well as other information, using UWN 110. The unicast content may include original unicast content, personalized unicast content provided as part of a content interaction service, and the like. The UTs 102 support unidirectional broadcast communications from BWN 120, include receiving information over BWN 120 using UWL 121. The UTs 102 receive broadcast content from BWN 120. The broadcast content may include original broadcast content, modified and/or additional broadcast content provided as part of a content interaction service, and the like.

The UTs 102 provide means for requesting content, receiving content, presenting content, interacting with presented content, and performing like functions. For example, each of the UTs 102 includes one or more user interfaces (e.g., buttons, keypads, and the like) enabling associated users to subscribe to content services, request content, interact with presented content, and the like, as well as various combinations thereof. The UTs 102 provide means for presenting received content. For example, each of the UTs 102 includes one or more user interfaces (e.g., screens, speakers, and the like) enabling associated users to review content. For example, UTs 102 may include wireless user terminals such as mobile phones, personal digital assistants, and the like.

The CIMS 160 manages content interaction services. The CIMS 160 receives content interaction information from UTs 102. The content interaction information may include any information derived from user interaction with content. The CIMS 160 provides one or more content interaction services using the content interaction information and at least one service parameter (e.g., locations of the user terminals from which the content interaction information is received, user preference information for users associated with user terminals from which the content interaction information is received, and the like, as well as various combinations thereof). The CIMS 160 may manage many different content interaction services. The operation of CIMS 160 in managing content interaction services may be better understood with respect to FIG. 2.

Figure 2:
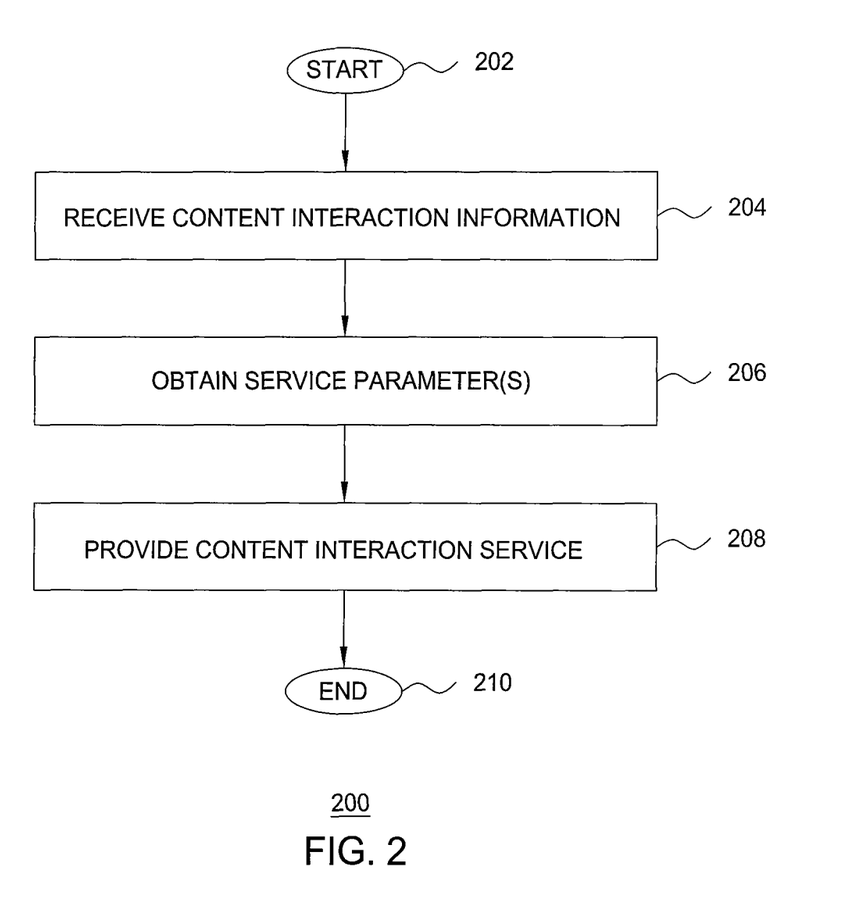
FIG. 2 depicts a method according to one embodiment of the present invention.

FIG. 2 depicts a method according to one embodiment of the present invention. Specifically, method 200 of FIG. 2 includes a method for providing one or more content interaction services for a user terminal. Although depicted and described with respect to one user terminal, one or more content interaction services may be provided to multiple user terminals. Although depicted and described as being performed serially, at least a portion of the steps of method 200 of FIG. 2 may be performed contemporaneously, or in a different order than depicted and described with respect to FIG. 2. The method 200 begins at step 202 and proceeds to step 204.

At step 204, content interaction information is received. The content interaction information is received from a user terminal. The content interaction information is generated at the user terminal based on interactions by a user of the user terminal with content presented on the user terminal. The content interaction information is received from the user terminal over the unicast wireless network serving that user terminal. The content interaction information may include information about content being presented at the user terminal, information about use of one or more user interfaces during presentation of the content, application context information, and the like, as well as various combinations thereof.

For example, user interaction information may identify the source of the content being presented (e.g., a channel being presented at the user terminal, such as a radio channel being listened to, a television station being watched, and the like), content being presented, the type of content being presented (e.g., text, audio, video, and the like), and the like, as well as various combinations thereof. For example, user interaction information may identify keys pressed on the user terminal and the results of keys pressed on the user terminal, such as operations performed on the user terminal in response to such key presses, requests initiated in response to such key presses, and the like, as well as various combinations thereof. As described herein, such content interaction information is merely exemplary, i.e., less or more content interaction information may be received.

At step 206, one or more service parameters are obtained. In one embodiment, the same service parameter(s) is always obtained. In one embodiment, the service parameter(s) that is obtained may be dependent on at least a portion of the received content interaction information. In one embodiment, the service parameter(s) that is obtained may be dependent on the content interaction service that is requested (which may be explicitly requested in the content interaction information, or determined based on the content interaction information that is received). For example, service parameters may include user terminal location information, user preference information, and like service parameters, as well as various combinations thereof.

In one embodiment, user terminal location information may include a network location of the user terminal. The network location of the user terminal may identify a cellular region in which the user terminal is located and, optionally, identifies a unicast wireless network and/or a broadcast wireless network serving that cellular region. For example, network location information may be used for identifying the unicast wireless network or broadcast wireless network over which to provide a content interaction service. For example, network location information may be used to combine content interaction information received from user terminals in the same cellular region or the same group of cellular regions (e.g., for determining whether to provide content over the unicast wireless network(s) or the broadcast wireless network(s) for the cellular region(s)).

In one embodiment, user terminal location information may include a geographical location of the user terminal. The geographical location of the user terminal identifies a geographic region in which the user terminal is located and, optionally, may identify a unicast wireless network and/or a broadcast wireless network serving that geographic region. For example, geographical location information may be used in order to provide personalized content (e.g., local weather, local advertising, and the like) to the user terminal. For example, this geographical location information may be used for aggregating voting statistics (e.g., where users are voting in response to content they are viewing at their respective user terminals) on various scales, e.g., regionally, by state, by country, and the like, as well as various combinations thereof.

The user preference information includes any information associated with the user that is indicative of a preference of the user. For example, user preference information may include user profile information, one or more content interaction services subscribed to by the user or available to the user, one or more other services subscribed to by the user or available to the user, specific content subscribed to by the user, one or more levels of service with which different services and/or content should be provided to the user, specifics with respect to providing content to the user (e.g., formats, quality-of-service, priorities, and the like), and the like, as well as various combinations thereof.

The service parameter(s) may be obtained from one or more network components. In one embodiment, for example, CIMS 160 may obtain at least a portion of the service parameters locally (i.e., service parameters stored within CIMS 160). In one embodiment, CIMS 160 may obtain at least a portion of the service parameters remotely from one or more network components (e.g., from one or more of PDSN 130, RNC 114, UBS 112, UTs 102, and the like, as well as various combinations thereof). Although omitted for purposes of clarity, state information may be obtained from one or more other network components which have been omitted for purposes of clarity, such as home location registers (HLRs), user preference databases, user profile databases, user service subscription databases, and the like, as well as various combinations thereof.

In one embodiment, in which CIMS 160 obtains service parameters locally, the service parameters may be stored on CIMS 160 directly (e.g., information maintained on CIMS 160) and/or indirectly (e.g., service parameters stored on other components in the network that are transferred to CIMS 160, e.g., periodically, aperiodically in response to requests from CIMS 160, and the like). In one embodiment, in which CIMS 160 is implemented on one or more existing network components (e.g., on one or more of PDSN 130, RNC 114, BTSs 112, and the like; rather than being implemented as a standalone system), CIMS 160 may obtain various other types of service parameters locally, depending on the network component(s) on which CIMS 160 is implemented. The implementation of CIMS 160 on one or more existing network components is depicted and described herein with respect to FIG. 3.

In one embodiment, in which CIMS 160 obtains service parameters remotely, CIMS 160 may obtain service parameters from one or more network components. For example, user terminal location information may be obtained from radio network controllers (RNCs), home location registers (HLRs), global positioning systems (GPSs), and the like, as well as various combinations thereof. For example, user preference information may be obtained from a user preference database, a user profile database, a user service subscription database, a content interaction management system (illustratively, CIMS 160), and the like, as well as various combinations thereof. The service parameter(s) may be obtained from any network component from which such information is available. The content interaction services provided by the present invention are not limited by the source(s) of service parameters used to provide such services.

At step 208, a content interaction service is provided. The content interaction service that is provided may be explicitly identified as part of the received content interaction information. The content interaction service that is provided may be determined by processing the content interaction information and, optionally, by processing associated information, such as one or more of the service parameters. The content interaction service may be provided using one or more unicast wireless networks, one or more broadcast wireless networks, and the like, as well as various combinations thereof (depending on content interaction service). Although numerous content interaction services may be provided in accordance with the present invention, exemplary content interaction services are described for purposes of providing a sampling of such content interaction services enabled by the present invention.

A first content interaction service that may be provided is modification of original broadcast content to be delivered over the broadcast wireless network. The modification of original broadcast content is performed using content interaction information and at least one service parameter. The modification of original broadcast content may include modifying broadcast content using additional content (e.g., generating additional content that is combined with the original broadcast content to form modified broadcast content), modifying broadcast content without using additional content (e.g., affecting broadcast content based on real-time user ratings), collecting and broadcasting user-generated content, and the like, as well as various combinations thereof.

In one embodiment, modification of original broadcast content includes modifying original broadcast content using additional content. The additional content is content generated from content interaction information and, optionally, one or more service parameters. The additional content is combined with the original broadcast content to form modified broadcast content, which is provided to user terminals over the broadcast wireless network. The additional content may include any content which may be combined with original broadcast content being provided (or scheduled to be provided) over a broadcast wireless network in order to modify the broadcast content being provided (or scheduled to be provided) over the broadcast wireless network.

In one embodiment, for example, additional content may include voting data. For example, voting data may include aggregated votes from users voting on a favorite song to be played on a radio station, voting on a television program (e.g., voting for or against participants of a television program), and the like. Similarly, in one embodiment, for example, additional content may include quiz statistics. For example, quiz statistics may include aggregated quiz answers received from users (e.g., from answering questions in online quiz games, from answering questions on radio or television programs, and the like) in order to display percentages of users selecting answers to various questions.

In one embodiment, for example, additional content may include content generated by a user (denoted as user-generated content) that is intended for broadcast to other users. For example, additional user-generated content may include messages from users which may be combined with television programming such that the user messages scroll across the display as the television programming is presented. For example, during awards shows, users may submit text messages about their favorite performers, and the text messages may scroll across the bottom of the display. For example, additional user-generated content may include user-created audio clips, user-created video clips, and the like, as well as various combinations thereof.

In one embodiment, where additional content is formed by aggregating content interaction information, the additional content may be formed by aggregating content interaction information based on at least a portion of the service parameters. For example, content interaction information (e.g., votes, quiz statistics, and the like) may be aggregated for display based on geographical regions from which the content interaction information originates (as determined from geographical location information associated with user terminals from which content interaction information is received). Similarly, for example, aggregated content interaction information may be displayed based on geographical regions from which content interaction information originates (e.g., votes from users in one geographical region are displayed using one broadcast wireless network while votes from users in another geographical region are displayed using another broadcast wireless network).

The formation and distribution of modified broadcast content over broadcast wireless networks may be performed using many techniques. In one embodiment, CIMS 160 generates additional content using content interaction information and one or more service parameters. In one embodiment, in which CIMS 160 operates as a proxy for CSs 150, CIMS 160 combines the additional content with the original broadcast content from CS(s) 150 to form modified broadcast content, and provides the modified broadcast content toward UTs 102 using BWN 110. In another embodiment, in which CIMS 160 operates as a proxy for CSs 150, CIMS 160 provides the additional content to one of CSs 150 from which the associated original broadcast content is provided, and the CS 150 combines the additional content from CIMS 160 with the original broadcast content to form modified broadcast content and provides the modified broadcast content toward UTs 102 using BWN 120.

In one embodiment, broadcast content may be modified without adding additional content. In one such embodiment, for example, broadcast content may be affected based on real-time user ratings. In one example, users listening to a radio station may vote for songs such that the songs receiving more votes are played more times than songs receiving less votes. In another example, users watching a television program may be given a choice of program endings such that the users can vote to determine the outcome of the television program. Although described with respect to specific examples, various other types of broadcast content may be modified in various other ways without adding additional content.

In one embodiment, user-generated content may be collected and broadcast over the broadcast wireless network. The user-generated content may include any content. For example, the user generated content may include text-based content (e.g., articles, stories, and the like written by users), images (e.g., pictures taken by users, scans of artwork made by users, and the like), audio content (e.g., songs, speeches, and the like recorded by users), video content (e.g., videos, movies, and the like recorded by users), and the like, as well as various combinations thereof. Although described with respect to specific examples, various other types of user-generated content may be collected and broadcast over broadcast wireless networks.

A second content interaction service that may be provided is providing personalized content over the unicast wireless network. The personalized content provided to a user terminal over the unicast wireless network is selected based on the content interaction information received from that user terminal, location information associated with that user terminal (including network location and geographical location information), and, optionally, one or more other service parameters. For example, in one embodiment, at least a portion of the personalized information may be determined using user preference information. For example, personalized content may include local advertisements, local news, local weather, local traffic, local classifieds, local personals, and the like, as well as various combinations thereof. The personalized content may be any type of content, e.g., text, audio, video, multimedia, and the like, as well as various combinations thereof.

As described herein, personalized content is selected using the content interaction information received from the user terminal. For example, if content interaction information indicates that the user is watching a television program about automobiles, advertisements for local car dealerships may be selected based on that content interaction information and the geographical location of the user terminal. For example, if content interaction information indicates that the user is reading a news article on employment, local job listings may be selected based on the content interaction information and the geographical location of the user terminal. Although described with respect to a few specific examples, any personalized content may be selected using content interaction information and one or more service parameters.

In one embodiment, in which CIMS 160 operates as a proxy for CSs 150, CSs 150 provide personalized content to CIMS 160, which propagates the personalized content toward one of the UTs 102 (i.e., the one of the UTs 102 from which the content interaction was received) over UWN 110. The CSs 150 may provide the personalized content to CIMS 160 in response to a request from CIMS 160, as the content becomes available at CSs 150, and the like, as well as various combinations thereof. In one embodiment, in which CIMS 160 does not operate as a proxy for CSs 150, one or more of CSs 150 propagates personalized content toward one of the UTs 102 (i.e., the one of the UTs 102 from which the content interaction was received) over UWN 110. The CSs 150 may propagate the personalized content toward UTs 102 in response to a request from CIMS 160, as the content becomes available at CSs 150, and the like, as well as various combinations thereof.

A third content interaction service that may be supported is a proxy service, in which a proxy provides an interface to one or more network-based services available to the user terminals. The network-based service provided to a user terminal is selected based on the content interaction information and, optionally, at least one of the service parameters. In one embodiment, information associated with the network-based service may be provided to the user terminal using a unicast wireless network or a broadcast wireless network, depending on the network-based service (as well as the number of users using the network-based service and possibly some other factors). In one embodiment, for example, the proxy may serve as an e-commerce portal. In one such example, the proxy may provide a unified portal supporting charging for multiple different vendors.

In one embodiment, CIMS 160 provides the proxy service (i.e., CIMS 160 operates as the proxy for the network-based services. In another embodiment, one or more other network components (i.e., proxy or proxies) provide the proxy service. In this embodiment, CIMS 160, in response to identifying a request for a proxy service (e.g., from content interaction information and, optionally, at least a portion of the service parameters), directs the request for the proxy service to the proxy or proxies configured to service that request. In one such embodiment, the proxy services the redirected request indirectly (i.e., by directing communications back through CIMS 160 from which the request was directed). In another such embodiment, the proxy services the redirected request directly (i.e., without using CIMS 160 from which the request was directed).

Although primarily depicted and described herein with respect to specific content interaction services (e.g., modification of broadcast content using additional content, affecting broadcast content without adding additional content, providing proxy services, and the like), various other content interaction services may be provided using the present invention.

The other content interaction services may be provided using the unicast wireless network, the broadcast wireless network, or a combination of the unicast and broadcast wireless networks. The other content interaction services may also include other forms of network-based services which may or may not include communications using the unicast broadcast network and/or broadcast wireless network.

Although primarily depicted and described herein with respect to one user terminal, it is clear from exemplary content interaction services described hereinabove that some content interaction services may be provided for multiple user terminals. For example, content interaction information from each user terminal in a group of user terminals (which may be grouped based on cellular region, content being reviewed, and the like, as well as various combinations thereof) may be aggregated in order to provide the content interaction service. For example, user selections (e.g., voting data, quiz data, and the like) may be aggregated based on groups of user terminals, user selections may be distributed based on groups of user terminals, and the like, as well as various combinations thereof.

Figure 3:
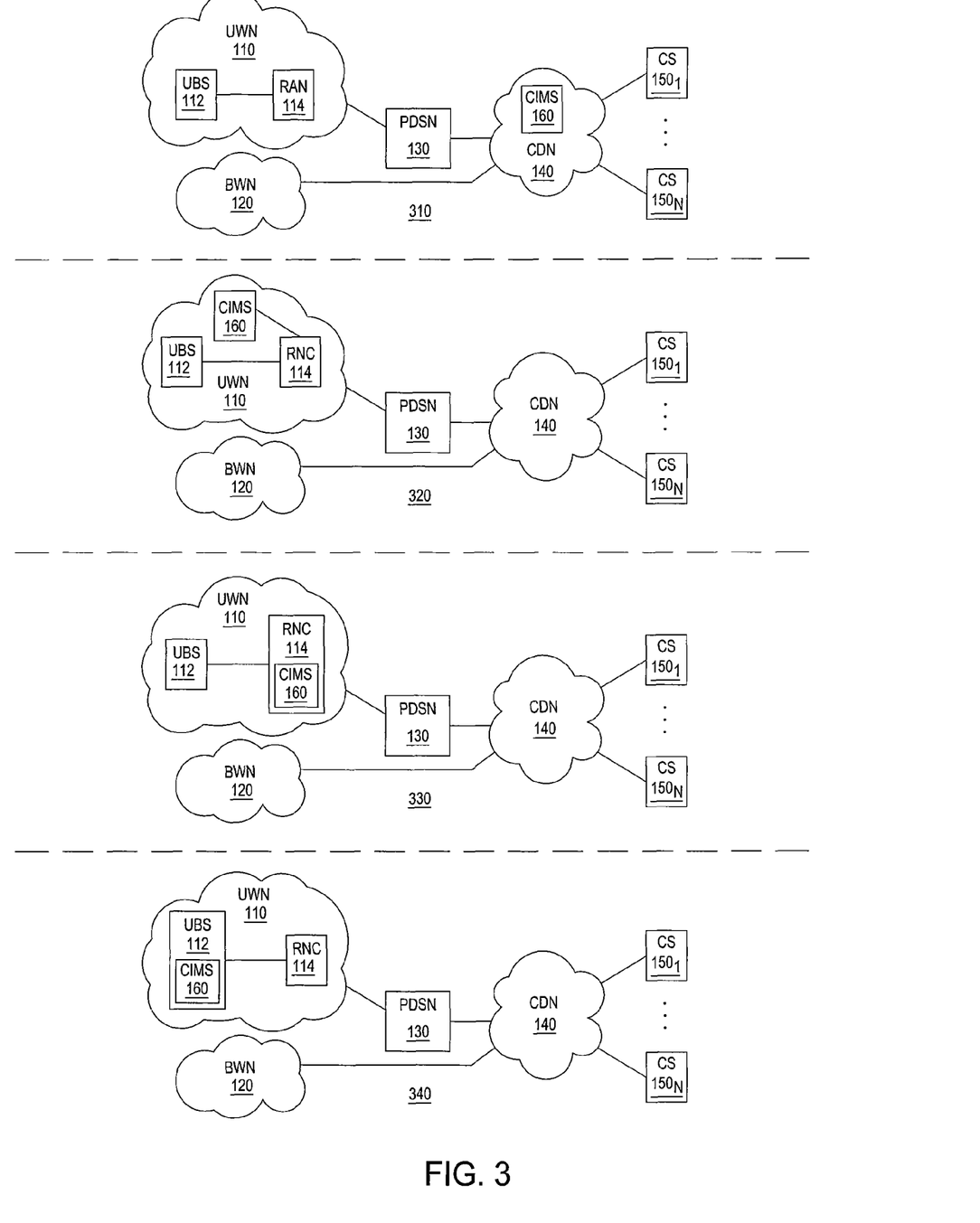
FIG. 3 depicts high-level block diagrams of exemplary implementations of the communication network of FIG. 1.

As depicted in FIG. 1, CIMS 160 is depicted and described as being generally associated with communication network 100. Specifically, as depicted and described with respect to FIG. 1, CIMS 160 is deployed as a standalone system in communication with CDN 140. Although primarily depicted and described herein with respect to the implementation scenario of FIG. 1, various other implementation scenarios may be used in accordance with the present invention (some examples of which are depicted and described herein with respect to FIG. 3). FIG. 3 depicts high-level block diagrams of exemplary implementation scenarios (alternative scenarios for implementation of CIMS 160 depicted and described herein with respect to FIG. 1).

As depicted in FIG. 3, in one embodiment (depicted as communication network 310 of FIG. 3) CIMS 160 may be implemented within CDN 140. In one such embodiment, CIMS 160 may be implemented as a standalone system hosted within CDN 140. In another such embodiment, CIMS 160 may be co-located on one or more existing systems within CDN 140. In such embodiments, no changes are required to the existing network elements or existing standard by which such network elements operate, and issues such as user mobility/roaming are easily dealt with; however, other implementation scenarios depicted and described herein with respect to FIG. 3 may provide better network performance (including better backhaul resource utilization and better air link resource utilization) and user experience.

As depicted in FIG. 3, in one embodiment (depicted as communication network 320 of FIG. 3) CIMS 160 may be implemented as a standalone system hosted within UWN 110 (receiving feedback from UWN 110). In such embodiments, content may be transmitted to user terminals anywhere within the routing area, minimal changes are required to the existing network elements (e.g., BS 112 and RNC 114), and no changes are required to existing standards by which such network elements operate. Furthermore, in such embodiments, battery drain associated with user terminals receiving content is minimized, impact on other user terminals is minimized, and overall network performance is improved (e.g., TCP performance may be enhanced using lower layer information, under-utilized backhaul resources are utilized, and other network performance improvements may be realized).

As depicted in FIG. 3, in one embodiment (depicted as communication network 330 of FIG. 3), CIMS 160 may be implemented on RNC 114 of UWN 110 (as software and storage on RNC 114). In such embodiments, content may be transmitted to user terminals anywhere within the routing area and, although changes are required to RNC 114, minimal changes are required to other existing network elements (e.g., BSs 112) and no changes are required to existing standards by which such network elements operate. Furthermore, in such embodiments, battery drain associated with user terminals receiving content is minimized, impact on other user terminals is minimized, and overall network performance is improved (e.g., TCP performance may be enhanced using lower layer information, under-utilized backhaul resources are utilized, and other network performance improvements may be realized).

As depicted in FIG. 3, in one embodiment (depicted as communication network 340 of FIG. 3), CIMS 160 may be implemented on UBS 112 of UWN 110 (as software and storage on UBS 112). In such embodiments, optimum user experience is achieved (e.g., battery drain associated with user terminals receiving content is minimized and impact on other user terminals is minimized by leveraging a finer granularity of state information) and overall network performance is improved; however, such embodiments may result in complex mobility management (e.g., the user may leave the cellular region before the requested content has been completely received by the user terminal).

Although depicted and described herein with respect to specific implementation scenarios, various other implementation scenarios may be utilized in accordance with the present invention. In some embodiments, CIMS 160 may be implemented across multiple networks (e.g., a first portion of the functions of CIMS 160 may be implemented within CDN 140 and a second portion of the functions of CIMS 160 may be implemented within UWN 110). In some embodiments, CIMS 160 may be implemented across multiple network components (both within and between networks). For example, in one embodiment, CIMS 160 may be distributed across RNC 114 and UBS 112 such that various combinations of software and storage required in support of the functions of CIMS 160 is implemented across the different network components.

Although primarily depicted and described herein as using a specific type of unicast wireless network (illustratively, an EVDO unicast wireless network) and a specific type of broadcast wireless network (illustratively, a MediaFLO broadcast wireless network), the content interaction service functions of the present invention may be implemented using various other types of unicast wireless networks and broadcast wireless networks. For example, content interaction service functions of the present invention may be implemented using other unicast wireless networks and/or other broadcast wireless networks, as well as various combinations thereof.

In one embodiment, for example, the unicast wireless network may be a Universal Mobile Telecommunications System (UMTS) wireless network, a General Packet Radio Service (GPRS) wireless network, and the like. In one embodiment, for example, the broadcast wireless network may be a Multimedia Broadcast Multicast Service (MBMS) network, a Digital Multimedia Broadcasting (DMB) network, and the like. Although primarily depicted and described herein as separate networks, in one embodiment the unicast and broadcast wireless networks may be integrated, such as in a Broadcast and Multicast Service (BCMCS) wireless network and like networks. In one such embodiment, for example, UBS 112 and BBS 122 may be co-located.

Since, as described herein, the present invention is not limited to implementation using 3GPP-based EVDO unicast wireless networks, although primarily depicted and descried herein within the context of a 3GPP-based EVDO unicast wireless network in which service parameters are obtained from UBSs, RNCs, and PDSNs, service parameters may be obtained from any network components from which such service parameters are available. For example, in UMTS and GPRS wireless networks, service parameters may be obtained from Serving GPRS Support Node (SGSN) and/or Gateway GPRS Support Node (GGSN) components, although information available from such components may vary depending on wireless network type since such components often perform different functions in different wireless networks. Thus, service parameters used for providing content interaction services may be obtained from any source of such service parameters.

Figure 4:
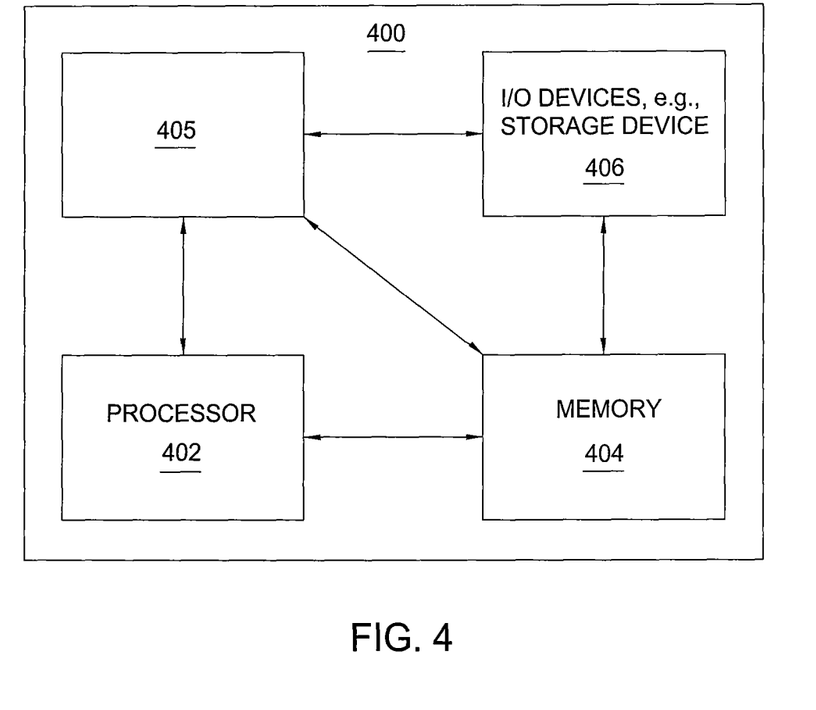
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a content interaction service management module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, a speaker, and the like)).

It should be noted that the present invention may be implemented in software and/or in a combination of software and hardware, e.g., using application specific integrated circuits (ASIC), a general purpose computer or any other hardware equivalents. In one embodiment, the present content interaction service management process 405 can be loaded into memory 404 and executed by processor 402 to implement the functions as discussed hereinabove. As such, content interaction service management process 405 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for providing an interactive service in a wireless communication system, comprising:
    receiving content interaction information indicative of interactions by a user with content presented at a wireless user terminal, wherein said content is provided toward the wireless user terminal over a broadcast wireless network, wherein said content interaction information is received over a unicast wireless network;
    identifying a user selection from the content interaction information;

aggregating the user selection with other user selections associated with other user terminals to form aggregate user selections;

obtaining at least one service parameter; and providing the interactive service using the content interaction information, wherein the interactive service is provided using at least one of the unicast wireless network and the broadcast wireless network;

wherein the interactive service provided via the broadcast wireless network comprises propagating toward user terminals combined content formed by aggregating user selections with broadcast content.

2. The method of claim 1, wherein providing the interactive service comprises:

extracting user-generated content from the content interaction information; and providing the user-generated content over the broadcast wireless network.

3. The method of claim 1, wherein providing the interactive service comprises:

identifying personalized content using the content interaction information and at least one service parameter, wherein the at least one service parameter comprises a location of the wireless user terminal; and providing the personalized content toward the wireless user terminal using the unicast wireless network.

4. The method of claim 3, wherein the at least one service parameter comprises user preference information associated with a user of the wireless user terminal.

5. The method of claim 1, wherein providing the interactive service comprises:

operating as a proxy for an network-based service.

6. The method of claim 5, wherein the network-based service comprises an e-commerce service, wherein operating as the proxy comprises operating as a portal for a plurality of online vendors.

7. The method of claim 1, further comprising:

obtaining at least one service parameter associated with the wireless user terminal;

wherein at least one of the aggregating and the combining is performed based on the at least one service parameter.

8. An apparatus for providing an interactive service in a wireless communication system, comprising:

means for receiving content interaction information indicative of interactions by a user with content presented at a wireless user terminal, wherein said content is provided toward the wireless user terminal over a broadcast wireless network, wherein said content interaction information is received over a unicast wireless network;

means for identifying a user selection from the content interaction information;

means for aggregating the user selection with other user selections associated with other user terminals to form aggregate user selections;

means for obtaining at least one service parameter; and means for providing the interactive service using the content interaction information, wherein the interactive service is provided using at least one of the unicast wireless network and the broadcast wireless network;

wherein the interactive service provided via the broadcast wireless network comprises propagating toward user terminals combined content formed by aggregating user selections with broadcast content.

9. The apparatus of claim 8, wherein the interactive service is provided using the content interaction information and the at least one service parameter.

10. The apparatus of claim 8, wherein the means for providing the interactive service comprises:

means for extracting user-generated content from the content interaction information; and means for providing the user-generated content over the broadcast wireless network.

11. The apparatus of claim 8, wherein the means for providing the interactive service comprises:

means for identifying personalized content using the content interaction information and the at least one service parameter, wherein the at least one service parameter comprises a location of the wireless user terminal; and means for providing the personalized content toward the wireless user terminal using the unicast wireless network.

12. The apparatus of claim 8, wherein the means for providing the interactive service comprises:

means for operating as a proxy for an network-based service.

13. The apparatus of claim 12, wherein the network-based service comprises an e-commerce service, wherein operating as the proxy comprises operating as a portal for a plurality of online vendors.

14. A non-transient computer readable storage medium storing a software program, that, when executed by a computer, causes the computer to perform a method for providing an interactive service in a wireless communication system, the method comprising:

receiving content interaction information indicative of interactions by a user with content presented at a wireless user terminal, wherein said content is provided toward the wireless user terminal over a broadcast wireless network, wherein said content interaction information is received over a unicast wireless network;

identifying a user selection from the content interaction information;

aggregating the user selection with other user selections associated with other user terminals to form aggregate user selections;

obtaining at least one service parameter; and providing the interactive service using the content interaction information and the at least one service parameter, wherein the interactive service is provided using at least one of the unicast wireless network and the broadcast wireless network wherein the interactive service provided via the broadcast wireless network comprises propagating toward user terminals combined content formed by aggregating user selections with broadcast content.

15. The computer readable storage medium of claim 14, wherein the interactive service is provided using the content interaction information and the at least one service parameter.

16. The computer readable storage medium of claim 14, wherein providing the interactive service comprises:

extracting user-generated content from the content interaction information; and providing the user-generated content over the broadcast wireless network.

17. The computer readable storage medium of claim 14, wherein providing the interactive service comprises:

identifying personalized content using the content interaction information and the at least one service parameter, wherein the at least one service parameter comprises a location of the wireless user terminal; and providing the personalized content toward the wireless user terminal using the unicast wireless network.

18. The computer readable storage medium of claim 14, wherein providing the interactive service comprises:
operating as a proxy for an network-based service.

19. The method of claim 1, further comprising:
obtaining at least one service parameter associated with the wireless user terminal.

20. The method of claim 19, wherein the at least one service parameter comprises at least one of a geographical location of the wireless user terminal, a network location of the wireless user terminal, and user preference information associated with at least one user of the wireless user terminal.

21. The method of claim 19, wherein obtaining the at least one service parameter comprises:
identifying the interactive service using at least a portion of the content interaction information;
identifying the at least one service parameter based on the identified interactive service; and
obtaining the at least one identified service parameter.

22. The method of claim 19, wherein the interactive service is provided using the content interaction information and the at least one service parameter.

* * * * *